United States Patent [19]
Moessner et al.

[11] Patent Number: 5,475,334
[45] Date of Patent: Dec. 12, 1995

[54] OUTPUT DRIVER CIRCUIT WITH FREE-SWITCHABLE OUTPUT

[75] Inventors: Rudolf Moessner, Schwandorf; Roman Wagner, Kuemmersbruck, both of Germany

[73] Assignee: Siemens Aktiengesellschaft, Munich, Germany

[21] Appl. No.: 218,497

[22] Filed: Mar. 28, 1994

[30] Foreign Application Priority Data

Apr. 15, 1993 [EP] European Pat. Off. .............. 93106139

[51] Int. Cl.⁶ .................................................. H02J 1/00
[52] U.S. Cl. .......................... 327/530; 327/108; 327/365
[58] Field of Search ........................................ 307/126, 270, 307/272.3, 296.1, 296.4, 571, 572; 327/109, 310, 318, 321, 327, 379, 530, 544, 545; 361/55, 56, 58, 91

[56] References Cited

U.S. PATENT DOCUMENTS 3,870,905 3/1975 Chikazawa ............................. 307/254
4,296,340 10/1981 Horan ..................................... 327/310
4,677,313 1/1987 Mimoto ................................... 307/270

FOREIGN PATENT DOCUMENTS 4110335 3/1991 Germany .
9207402 4/1992 WIPO .

Primary Examiner—Timothy P. Callahan
Assistant Examiner—Jeffrey Zweizig

[57] ABSTRACT

The present invention relates to an output driver circuit and in particular, an analog output driver circuit. Up to now, relays have been used in such driver circuits for the switching the outputs from output terminals (e.g., to ground) in the event of surges in the supply voltage. In accordance with the present invention, the relay is replaced by an electronic output switch element which has, free of control, a well-defined switch behavior. The output switch element is preferably a self-conducting field-effect transistor one connection of which is connected to the output line while its other connection is connected to ground.

11 Claims, 1 Drawing Sheet

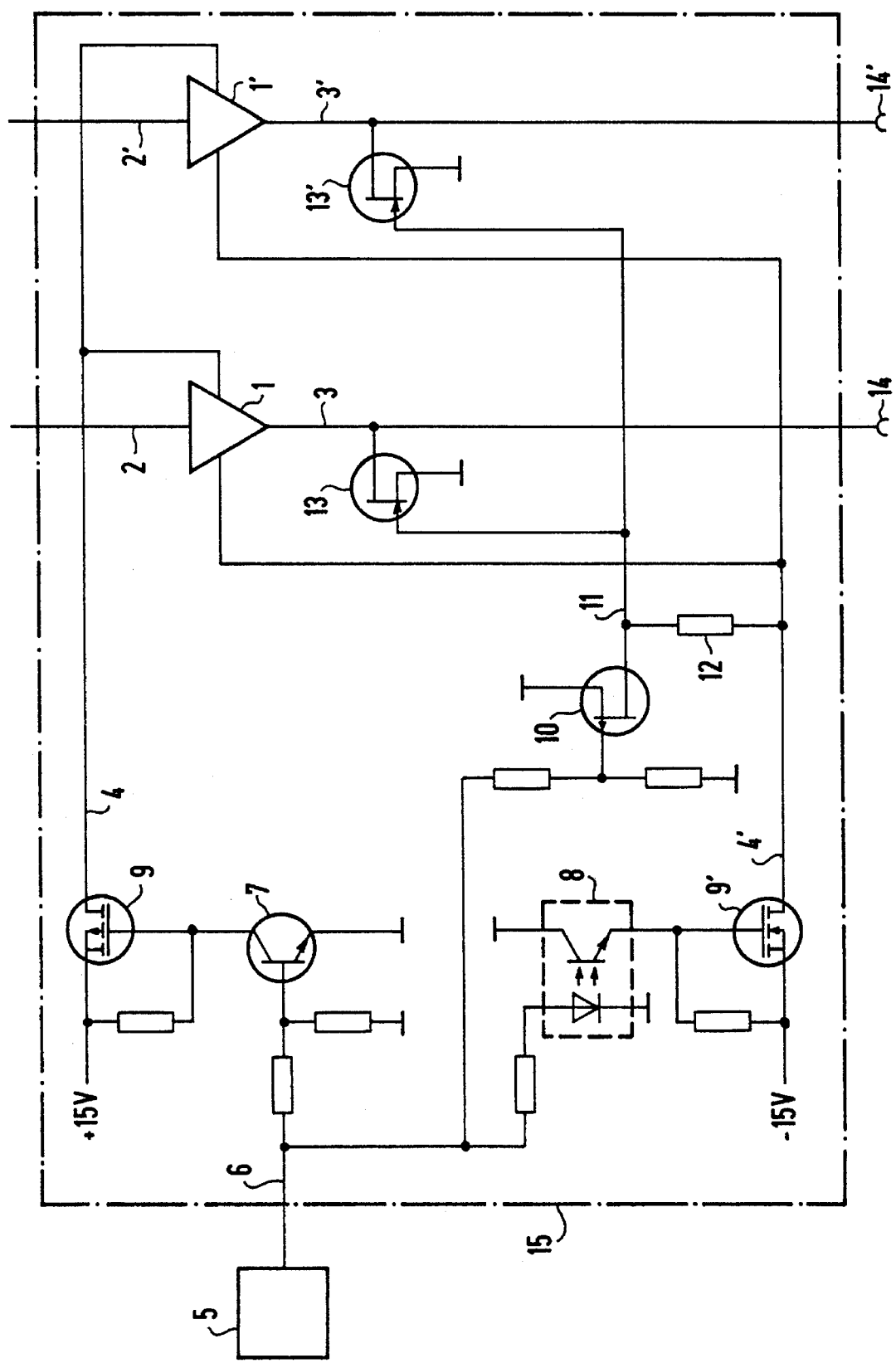

OUTPUT DRIVER CIRCUIT WITH FREE-SWITCHABLE OUTPUT

BACKGROUND OF THE INVENTION

The present invention relates to an output driver circuit which can be fed with an input signal via an input line and which delivers an output signal, which corresponds to the input signal, via an output line. The output driver circuit can be connected to two supply voltages, for example +15 V and −15 V, via two supply lines. The output line includes an associated output switch element. The output switch element has two switch connections and can be fed with a switch signal, via a control line, for uncoupling the output on the output line from an output terminal, to ground for example.

Such driver circuits are used in stored-programmable controls. In the past, a relay was used as the output switch element. The relay would dependably switch the output to ground in the event of voltage surges. Unfortunately, relays have a number of disadvantages. First, they are relatively expensive. Furthermore, they have a relatively short life. In addition, relays cannot be miniaturized, in view of the air gaps which are necessary for reliable switching.

In view of the above disadvantages, there exists a need to create an output driver circuit which avoids the above disadvantages.

SUMMARY OF THE INVENTION

The present invention fulfills the above need by developing an output switch element as an electronic switch element having a well defined switch behavior when not being controlled by an external control signal. In other words, when the electronic output switch element is not controlled, it must either connect completely or block completely.

When the electronic output switch element is connected by its one switch connection to the output line and by its other switch connection to a reference potential, for example ground, and connects the output driver circuit to the output terminal, free of control, distortions of the signal are avoided in the normal operation of the output driver circuit.

If the voltage supply lines are provided with at least one electronic supply switch element having a well-defined switch behavior when not being controlled by an external control signal and to which a switch signal for uncoupling the output driver circuit can be fed via a control line, the supply voltage can be uncoupled from the driver voltage so that loading of the electronic output switch element upon a response of the electronic output switch element can be avoided. To this end, one such supply switch element is associated exclusively with each supply line.

If the electronic supply switch elements are arranged in the supply lines and block, even when not being controlled by an external control signal, the electronic supply switch elements are also not subjected to load in the event of a voltage surge.

The electronic output switch element is preferably developed as a self-conducting (i.e., normally closed) field-effect transistor. In an analogous manner, the electronic supply switch elements are developed as self-blocking (i.e., normally open) field-effect transistors.

Several combined output driver circuits having common supply lines are preferably supplied with power over common supply lines. In this way, only one supply switch element is required for several output driver circuits. The cost of the circuit can thereby be further decreased.

BRIEF DESCRIPTION OF THE DRAWINGS

The FIGURE is a circuit diagram of output driver circuits in accordance with the present invention.

DETAILED DESCRIPTION

Referring to the FIGURE, the output driver circuits 1, 1' are fed analog input signals over the input lines 2, 2'. In normal operation, the driver circuits 1, 1' deliver analog output signals corresponding to the input signals over the output lines 3, 3'. In normal operation, the driver circuits 1, 1' are connected over the supply lines 4 and 4' to the supply voltages +15 V and −15 V, respectively.

In normal operation, a voltage signal of +5 V is sent out by the monitoring unit 5 over the control line 6. Due to the positive voltage signal, the transistor 7 and the optocoupler 8 are conductive. In this way, the self-blocking (i.e., normally open and non-conductive) field-effect transistors 9, 9', used here as supply switch elements, are also made conductive. The driver circuits 1, 1' are thus supplied from the voltage sources.

The source input of the field-effect transistor 10 is connected directly to ground. Due to the positive voltage signal of the control line 6, a positive voltage is also present at the control input of the self-conducting (i.e., normally closed) field-effect transistor 10 thereby causing the transistor 10 not to conduct. Self-conducting (i.e., normally closed) field-effect transistors 13, 13' are used as output switch elements. Since the control line 11 of the self-conducting field-effect transistors 13, 13' is connected to −15 V supply via the resistor 12, a negative voltage signal is fed to the control inputs of the self-conducting (i.e., normally closed) field-effect transistors 13, 13'. The self-conducting (i.e., normally closed) field-effect transistors 13, 13' therefore also block (i.e., are caused to be non-conductive). The output signals, which are provided at the terminals 14, 14', therefore correspond to the input signals present on the input lines 2, 2'.

If the supply voltage of the circuit shown in the figure breaks down or if a disconnection from the terminals 14, 14' is desired for some other reason, the monitoring unit 5 sends out a signal of 0 V on the control line 6. The transistor 7 and the optocoupler therefore block (i.e., open). Accordingly, the self-blocking (i.e., normally open) field-effect transistors 9, 9' also block (i.e., are open and non-conductive). The driver circuits 1, 1' are thereby uncoupled from their supply potentials or switched free.

Furthermore the self-conducting (i.e., normally closed) field-effect transistor 10 becomes conductive. The voltage which is transmitted via the control line 11 to the control inputs of the self-conducting (i.e., normally closed) field-effect transistors 13, 13' therefore also increases to 0 V. The self-conducting (i.e., normally closed) field-effect transistors 13, 13' therefore become conductive. As a result, the terminals 14, 14' are switched free (i.e., uncoupled from output line 3,3' by short-circuiting the output to ground) from the driver circuits 1, 1'. In similar manner, the self-conducting (i.e., normally closed) field-effect transistors 13, 13' also become conductive when the monitoring unit 5 does not supply any signals at all.

Since the voltage supply of the driver circuits 1, 1' has been interrupted, the transistors 13, 13' are not loaded. Similarly the transistors 9, 9' are not loaded since they block (i.e., are open and non-conductive) and accordingly conduct only an extremely small current.

The circuit which has been described above can, of course, be used not only for one or two driver circuits but also for several driver circuits, for example, 8 or 16 driver circuits. Since exclusively electronic elements are required for the circuit described above, the circuit can also be integrated into an integrated circuit 15.

The circuit described above is particularly advantageous in the case of stored-programmable controls, for example in analog-output units or mixed analog input/output units.

Instead of self-conducting (i.e., normally closed) field-effect transistors 13, 13', self-blocking (i.e., normally open and nonconducting) field-effect transistors which are switched into the output lines 3, 3' could also be used. However, in normal operation of the driver circuits 1, 1', this would lead to distortions of the signal. Similarly, the supply switch elements 9, 9' could also be developed as self-conducting (i.e., normally closed) field-effect transistors which connect the supply potentials to each other or to ground. However, upon a switching free (i.e., an uncoupling from output by short circuiting to ground) of the driver circuits 1, 1' this would lead to a high thermal load on the supply switch elements. In similar manner, omitting the supply switch elements would lead to thermal loading of the output switch elements 13, 13'.

What is claimed is:

1. A circuit comprising:
   a) an input line to which an input signal can be fed;
   b) an output line;
   c) an output driver coupled between the input line and the output line and adapted to supply an output signal corresponding to the input signal over the output;
   d) supply lines coupling the output driver with supply potentials;
   e) a control line;
   f) a monitoring unit for monitoring the supply lines and for providing a control signal on the control line when the supply lines exhibit proper potentials;
   g) an electronic output switch element having two switch connections and to which a switch signal, for coupling the output line to the output terminal when the control signal is present on the control line and for uncoupling the output signal on the output line from the output terminal when the control signal is not present on the control line, can be fed via the control line, and having a well defined switch behavior when not provided with an external control signal; and
   h) a second control line; and
   i) an electronic supply switch element having a well-defined switch behavior when not provided with an external control signal, and being controlled based on a signal provided on the second control line,
   wherein at least one of the supply lines is uncoupled from the output driver when the external control signal is not supplied.

2. The circuit of claim 1 wherein an electronic supply switch element having a well-defined switch behavior is exclusively associated with each of the supply lines.

3. The circuit of claim 2 wherein the electronic supply switch elements are arranged in the supply lines and are normally open thereby blocking the supply voltage from the output driver when an external control signal is not applied to them.

4. The circuit of claim 3 wherein the electronic supply switch elements are self-blocking field-effect transistors.

5. The circuit of claim 1 further comprising:
   a further output driver circuit sharing the supply lines used by the output driver circuit.

6. A circuit comprising:
   a) an input line to which an input signal can be fed and which accepts an analog output from a stored-programmable control;
   b) an output line;
   c) an output driver coupled between the input line and the output line and adapted to supply an output signal corresponding to the input signal over the output;
   d) supply lines coupling the output driver with supply potentials;
   e) a control line;
   f) a monitoring unit for monitoring the supply lines and for providing a control signal on the control line when the supply lines exhibit proper potentials; and
   g) an electronic output switch element having two switch connections and to which a switch signal, for coupling the output line to the output terminal when the control signal is present on the control line and for uncoupling the output signal on the output line from the output terminal when the control signal is not present on the control line, can be fed via the control line, and having a well defined switch behavior when not provided with an external control signal.

7. A circuit comprising:
   a) an input line;
   b) an output driver circuit having an input coupled with said input line and having an output adapted to provide an output signal based on a signal provided on the input line;
   c) a first voltage supply;
   d) a first supply line coupling said first voltage supply with said output driver;
   e) a second voltage supply;
   f) a second supply line coupling said second voltage supply with said output driver;
   g) an output line coupled with said output of said output driver;
   h) a monitoring unit for monitoring the first and second supply lines and for providing a control signal on the control line when at least one of the first and second supply lines exhibits a proper potential; and
   i) an output switch element having a control input coupled with the monitoring unit, and having a first terminal coupled to said output line and a second terminal coupled to ground wherein said first terminal is connected with said second terminal thereby bringing said output line to ground when a control signal is not provided on the control line, and wherein said output switch element has a well defined switch behavior when a signal is not provided at said control input.

8. The circuit of claim 7 wherein said output switch element is self-conductive.

9. The circuit of claim 7 further comprising:
   a second control line;
   a first electronic supply switch element having a control input coupled with said second control line, a first terminal coupled with said first voltage supply, and a second terminal coupled with said first supply line, wherein said first electronic supply switch can be open based on a signal provided on said second control line thereby disconnecting said first voltage supply and said output driver; and a second electronic supply switch element having a control input coupled with said second control line, a first terminal coupled with said second voltage supply, and a second terminal coupled with said second supply line, wherein said second electronic supply switch can be open based on a signal provided on said second control line thereby disconnecting said second voltage supply and said output driver.

10. The circuit of claim 9 wherein said first and second electronic supply switches have a well defined switch behavior when an external control signal is not provided at their control inputs.

11. The circuit of claim 9 wherein said first and second electronic supply switches are self-blocking.

* * * * *